United States Patent Office 3,503,747
Patented Mar. 31, 1970

3,503,747
POTATO CHIPS
Elizabeth Marie Young, Doodletown Road,
Ancram, N.Y. 12502
No Drawing. Filed Feb. 16, 1967, Ser. No. 618,267
Int. Cl. A23l *1/12;* A23b *1/04*
U.S. Cl. 99—100    8 Claims

ABSTRACT OF THE DISCLOSURE

A process for producing potato chips by means of which the potato chips have a leaf-like configuration with speckled colors, and with a smoky flavor and taste.

---

This invention relates to a potato-chip process.

The object of this invention is to produce potato chips whose configurations are leaf-like, multi-colored to simulate the multi-colors found in autumn leaves, and which have a smoky flavor and taste to additionally paint and implant in the mind of the gourmet the psychologically pleasant and regeneratingly refreshing picture of burning autumn leaves.

In the first step of the process, a leaf-configured cutter is utilized to cut out a leaf-shaped pattern in the potatoes which are then sliced as thin as possible, soaked in cold water, rinsed and drained.

In the second step of the process, the potato slices are immersed in a deep-fat fryer whose fat is at a temperature of about 390 degrees Fahrenheit and cooked until crisp for approximately 90 seconds. This deep-fat fryer contains a mixture of frying fat and water-base colors. Of course, the water-base colors do not mix with the frying fat or oil; and, hence, when the potato slices are immersed and cooked in the deep-fat fryer, a speckled coloring is formed on the potato chips that is similar to and reminiscent of the speckled color of autumn leaves.

In the third step of the process, the fried potato chips are allowed to drain until there are not any more fat drippings, and then the drained potato chips are salted. The potato chips are placed over a suitable smoldering wood fire for a time sufficient to impart a smoky flavor and taste to the potato chips, but not long enough to blacken the potato chips. Experience has demonstrated that wood such as hickory, cherry and/or maple serves admirably for this function and purpose.

Moreover, such smoking further acts as a preservative to retard the growth of microorganisms because wood smoke contains chemicals which slow the growth of microorganisms.

Having thusly described my invention, I claim:

1. A potato-chip process comprising the following steps: the first step of preparing the potatoes in form and configuration for deep-fat frying; the second step of cooking the prepared potatoes in deep fat speckled coloring on the potato chips; and the third step of draining and salting the potato chips.

2. A process as recited in claim 1 wherein the form and configuration of the potatoes prepared in the first step is that of a leaf-shaped pattern, and wherein the leaf-shaped potatoes are thinly sliced.

3. A process as recited in claim 1 wherein in the third step the potato chips are further placed over a smoldering wood fire to impart a smoky flavor and taste to the potato chips.

4. A process as recited in claim 1 wherein the form and configuration of the potatoes prepared in the first step is that of a leaf-shaped pattern, and wherein the leaf-shaped potatoes are thinly sliced; and wherein in the third step the potato chips are further placed over a smoldering wood fire to impart a smoky flavor and taste to the potato chips.

5. A process as recited in claim 1 wherein the form and configuration of the potatoes prepared in the first step is that of a leaf-shaped pattern, wherein the leaf-shaped potatoes are thinly sliced, and wherein the sliced potatoes are soaked in water, rinsed and drained, thereafter.

6. A process as recited in claim 1 wherein in the second step the temperature of the mixture of frying fat and water-base colors is approximately 390 degrees Fahrenheit and wherein the potato chips are cooked for approximately 90 seconds until crisp.

7. A process as recited in claim 1 wherein the form and configuration of the potatoes prepared in the first step is that of a leaf-shaped pattern, wherein the leaf-shaped potatoes are thinly sliced, and wherein the sliced potatoes are thereafter soaked in water, rinsed and drained; and wherein in the second step the temperature of the mixture of frying fat and water-base colors is approximately 390 degrees Fahrenheit and wherein the potato chips are cooked for approximately 90 seconds until crisp.

8. A process as recited in claim 1 wherein the form and configuration of the potatoes prepared in the first step is that of a leaf-shaped pattern, wherein the leaf-shaped potatoes are thinly sliced, and wherein the sliced potatoes are thereafter soaked in water, rinsed and drained; wherein in the second step the temperature of the mixture of frying fat and water-base colors is approximately 390 degrees Fahrenheit and wherein the potato chips are cooked for approximately 90 seconds until crisp; and wherein in the third step the potato chips are further placed over a smoldering wood fire to impart a smoky flavor and taste to the potato chips.

References Cited

UNITED STATES PATENTS

| | | | |
|---|---|---|---|
| 2,612,453 | 9/1962 | Stahmer | 99—100 |
| 2,705,679 | 4/1955 | Griffiths et al. | 99—207 |
| 2,976,153 | 3/1961 | Arenson | 99—100 |
| 3,057,386 | 10/1962 | Massaro | 146—78 |
| 3,384,495 | 5/1968 | Potter et al. | 99—100 |

OTHER REFERENCES

Talbart, William F., and Smith, Ora, Potato Processing, AVI Publishing Co., Westport, Conn., 1959, pp. 255 and 270.

A. LOUIS MONACELL, Primary Examiner
W. A. SIMONS, Assistant Examiner

U.S. Cl. X.R.
99—148, 229